US007170830B2

(12) United States Patent
Kondo

(10) Patent No.: US 7,170,830 B2
(45) Date of Patent: Jan. 30, 2007

(54) INFORMATION RECORDING MEDIUM HAVING A WOBBLING GROOVE STRUCTURE

(75) Inventor: Tetsuya Kondo, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 11/282,487

(22) Filed: Nov. 21, 2005

(65) Prior Publication Data

US 2006/0072447 A1 Apr. 6, 2006

Related U.S. Application Data

(63) Continuation of application No. 10/268,798, filed on Oct. 11, 2002, now Pat. No. 7,012,860.

(30) Foreign Application Priority Data

Oct. 15, 2001 (JP) ............................ 2001-316674
Jan. 21, 2002 (JP) ............................ 2002-011164

(51) Int. Cl.
*G11B 7/24* (2006.01)

(52) U.S. Cl. ............................. 369/44.13; 369/275.3; 369/44.26

(58) Field of Classification Search ..................... None
See application file for complete search history.

(56) References Cited

U.S. PATENT DOCUMENTS

| | | | | |
|---|---|---|---|---|
| 5,583,847 | A | 12/1996 | Takeshima et al. | |
| 5,696,758 | A | 12/1997 | Yanagimachi et al. | |
| 5,923,640 | A * | 7/1999 | Takemura et al. | 369/275.3 |
| 5,999,504 | A | 12/1999 | Aoki | |
| 6,154,439 | A * | 11/2000 | Masuhara et al. | 369/275.4 |
| 6,411,575 | B1 | 6/2002 | Akiyama et al. | |
| 6,442,119 | B1 | 8/2002 | Sunagawa | |
| 6,580,678 | B2 | 6/2003 | Kondo et al. | |
| 6,654,332 | B2 | 11/2003 | Coene | |
| 6,666,265 | B1 | 12/2003 | Kato et al. | |
| 6,744,725 | B2 | 6/2004 | Kondo | |
| 6,771,579 | B2 * | 8/2004 | Suzuki | 369/59.12 |
| 7,065,015 | B2 * | 6/2006 | Lee et al. | 369/47.1 |
| 2002/0027869 | A1 * | 3/2002 | Morita et al. | 369/275.4 |

FOREIGN PATENT DOCUMENTS

| | | |
|---|---|---|
| JP | 2778405 | 5/1998 |
| JP | 10-302310 | 11/1998 |
| JP | 2001-229547 | 8/2001 |

* cited by examiner

*Primary Examiner*—Wayne Young
*Assistant Examiner*—Michael V. Battaglia
(74) *Attorney, Agent, or Firm*—Connolly Bove Lodge & Hutz LLP

(57) ABSTRACT

An information recording medium having at least a read only area and a recording and reproducing area is composed of at least: a substrate; a recording layer formed on the substrate so as to record and reproduce information; and a light transmission layer having transparency formed on the recording layer. The information recording medium is further characterized in that a wobbling groove corresponding to the read only area and another wobbling groove corresponding to the recording and reproducing area is formed on the substrate without overlapping with each other, the recording and light transmitting layers are continuously adhered over at least two areas of the read only area and the recording and reproducing area, reflectivity of the recording layer is more than 5%, and a push-pull signal output T3 reproduced from the read only area and another push-pull signal output T4 reproduced from the recording and reproducing area before recording satisfies relations of $T3 \geqq 0.1$, $T4 \geqq 0.1$ and $1.5 \geqq T3/T4 \geqq 0.5$.

2 Claims, 10 Drawing Sheets

1, 2

30

40

Q

| T3 | Tracking |
| --- | --- |
| 0.08 | Impossible |
| 0.10 | Possible |
| 0.15 | Possible |
| 0.20 | Possible |
| 0.22 | Possible |
| 0.24 | Possible |
| 0.30 | Possible |
| 0.35 | Possible |
| 0.40 | Possible |
| 0.44 | Possible |

| T4 | Tracking |
|---|---|
| 0.08 | Impossible |
| 0.10 | Possible |
| 0.15 | Possible |
| 0.20 | Possible |
| 0.22 | Possible |
| 0.24 | Possible |
| 0.30 | Possible |
| 0.35 | Possible |
| 0.40 | Possible |
| 0.44 | Possible |

Fig. 7

| T3 | T4 | T3/T4 | Area traversing reproduction |
|---|---|---|---|
| 0.10 | 0.10 | 1.0 | Possible |
| 0.10 | 0.20 | 0.5 | Possible |
| 0.10 | 0.25 | 0.4 | Impossible |
| 0.15 | 0.22 | 0.7 | Possible |
| 0.20 | 0.12 | 1.7 | Impossible |
| 0.20 | 0.13 | 1.5 | Possible |
| 0.20 | 0.28 | 0.7 | Possible |
| 0.20 | 0.40 | 0.5 | Possible |
| 0.20 | 0.45 | 0.4 | Impossible |
| 0.22 | 0.16 | 1.4 | Possible |
| 0.25 | 0.16 | 1.6 | Impossible |
| 0.25 | 0.17 | 1.5 | Possible |
| 0.25 | 0.25 | 1.0 | Possible |
| 0.25 | 0.34 | 0.7 | Possible |
| 0.25 | 0.44 | 0.6 | Possible |

Fig. 8

| Base-band before modulating | Base-band after modulated |
|---|---|
| 0 | 00, 11 |
| 1 | 01, 10 |

| Base-band before modulating | 1 0 0 0 0 1 |
|---|---|
| Base-band after modulated | 01 00 11 00 11 01 |

INFORMATION RECORDING MEDIUM HAVING A WOBBLING GROOVE STRUCTURE

This application is a Continuation of application Ser. No. 10/268,798, filed on Oct. 11, 2002, now U.S. Pat. No. 7,012,860, and for which priority is claimed under 35 U.S.C. § 120; and this application claims priority of Application No. 2001-316674 filed in Japan on Oct. 15, 2001 and Application No. 2002-011164 filed in Japan on Jan. 21, 2002 under 35 U.S.C. § 119; the entire contents of all are hereby incorporated by reference.

BACKGROUND OF THE INVENTION

1. Field of the Invention

The present invention relates to an information recording medium that is used for an optical recording and reproducing apparatus, which reads out information from the information recording medium with making the information recording medium move relatively, particularly, relates to an information recording medium having a read only area from which information can be read out together with a recording and reproducing area in which information can be recorded and from which the information can be reproduced.

2. Description of the Related Art

Until now, there is provided an information recording medium in a shape such as disciform, card and tape as a system of optical information recording medium, which is used for reading out information from the information recording medium that is made to relatively move. On a basis of recording or reproducing mechanism, such an information recording medium is divided into two types; one is a read-only type and the other is a recording and reproducing type (including recordable type and over-writable type). In other words, the former-type recording medium is prerecorded with information and forwarded in a market, and then a user just reproduces the information from the former-type recording medium. The latter-type recording medium is forwarded in a market without recording information. A user newly records information in the latter-type recording medium, and then the user reproduces the information from the latter-type recording medium.

On the contrary, in accordance with advancing multimedia in the world, it is increasing that a copyright is infringed by an electronic method and resulted in a remarkable problem. Consequently, it is required for even a recording and reproducing type information recording medium, which can be recorded by a user freely, to embed a specific code, which can not be rewritten by a user, in an information recording medium so as to protect a copyright from such infringement.

From the point of view of such a copyright protection, there has been provided various kinds of information recording mediums. Each of them has two areas together; one is a read only area that is recorded with permanent data, which can not be rewritten, and the other is a recording and reproducing area that is recordable (or a recording and reproducing area that is rewritable repeatedly). It is popular that an information recording medium, for example, is constituted by a read only area, which is composed of a pit array and prerecorded with a specific data, and a recording and reproducing area, which is composed of a continuous substance of grooves. A phase change type information recording medium such as a DVD-RAM (Digital Versatile Disc-Random Access Memory) and a DVD-RW (Digital Versatile Disk-ReWritable) has been put into practice. A user records information in a recording and reproducing area of such an information recording medium as user recording.

Incidentally, it is studied that a method of recording a permanent data by using a wobbling groove in conjunction with constituting a read only area by a groove instead of a pit array. If the permanent data is recorded by a wobbling groove as mentioned above, the original permanent data can be distinguished from altered permanent data, which have been forged by a person of counterfeiting, and resulted in disclosing a fact of infringing a copyright easily because such a person of counterfeiting can record the permanent data only through the phase-change recording method. In other words, he can record the permanent data by the pit-array recording method, which uses difference of reflectivity.

Accordingly, constituting a read only area by a groove can advance copy protection more than by the conventional pit-array recording method.

The inventor of the present invention has manufactured an above-mentioned information recording medium actually as a trial and reproduced the information recording medium, and then he recorded the information recording medium with information and reproduced the information. Consequently, he found some problems related to reproduction.

FIG. 19 is a plan view of an information recording medium 90 manufactured as a trial. The information recording medium 90 is composed of a read only area 93 and a recording and reproducing area 94. Further, both of the read only area 93 and the recording and reproducing area 94 are constituted by a groove. The read only area 93 is recorded with a specific code data for copy protection by a wobbling groove and the recording and reproducing area 94 is recorded with a location data, which is a reference data that is essential while recording, by a wobbling groove. When recording the specific code data and the location data, a shape of groove is optimized. In the read only area 93, the shape of groove is optimized so as for an output of the specific code data to be maximum. In the recording and reproducing area 94, user recording is performed while reading the location data and the shape of groove is optimized so as for a reproduction error rate at the time to be minimized.

The information recording medium 90 constituted as mentioned above has been loaded in various kinds of recording and reproducing apparatuses and operated. However, some problems arise such that traversing two areas has hardly performed smoothly and tracking has been out of control. In other words, when trying to read a location data in the recording and reproducing area 94 after reading out a specific code data for copy protection from the read only area 93, tracking has deviated off the control frequently.

This is caused by that functions of respective areas are different from each other. Further, characteristics of previously recorded data are also different from each other. Consequently, it is found that groove shapes of two areas are different from each other if the functions and characteristics are optimized in accordance with respective purposes and continuous reproduction with traversing through both areas can not be conducted.

SUMMARY OF THE INVENTION

Accordingly, in consideration of the above-mentioned problems of the prior art, an object of the present invention is to provide an information recording medium, which solves a tracking problem of deviating off the control that happens when traversing two different areas.

In order to achieve the above object, the present invention provides, according to an aspect thereof, an information recording medium, which has at least a read only area and a recording and reproducing area. The information recording are is composed of at least: a substrate; a recording layer formed on the substrate so as to record and reproduce information; and a light transmission layer having transparency formed on the recording layer. The information recording medium is further characterized in that a wobbling groove corresponding to the read only area and another wobbling groove corresponding to the recording and reproducing area is formed on the substrate without overlapping with each other, the recording and light transmitting layers are continuously adhered over at least two areas of the read only area and the recording and reproducing area, reflectivity of the recording layer is more than 5%, and a push-pull signal output T3 reproduced from the read only area and another push-pull signal output T4 reproduced from the recording and reproducing area before recording satisfies relations of $T3 \geqq 0.1$, $T4 \geqq 0.1$ and $1.5 \geqq T3/T4 \geqq 0.5$.

Other object and further features of the present invention will be apparent from the following detailed description when read in conjunction with the accompanying drawings.

BRIEF DESCRIPTION OF DRAWINGS

FIG. 7 is a table exhibiting relationship between a push-pull output T4 and tracking performance of the information recording medium according to the first embodiment of the present invention.

FIG. 8 is a table exhibiting relationship between a ratio of push-pull output T3 to T4 and tracking performance of the information recording medium according to the present invention.

DETAILED DESCRIPTION OF THE PREFERRED EMBODIMENTS

[First Embodiment]

Figure 1:
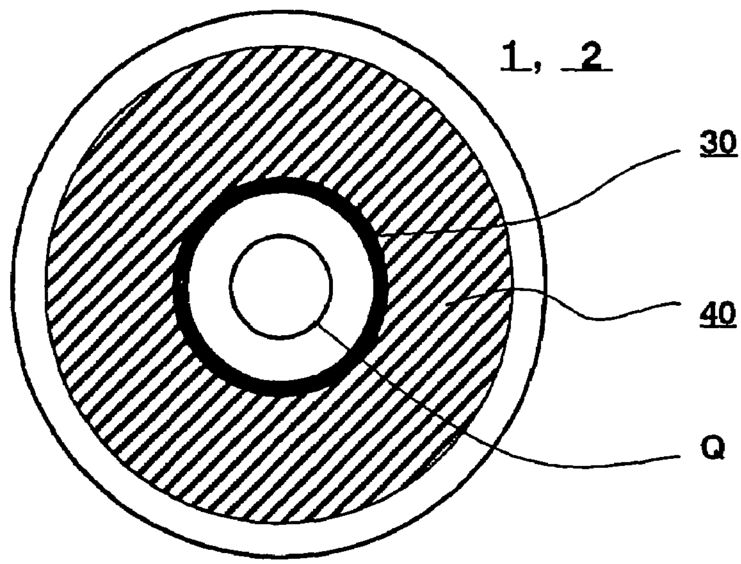
FIG. 1 is a plan view of an information recording medium in disciform according to a first embodiment of the present invention.

FIG. 1 is an enlarged plan view of an information recording medium in disciform according to a first embodiment of the present invention. In FIG. 1, an information recording medium 1 is composed of at least a read only area 30 and a recording and reproducing area 40, and provided with a center hole "Q". In the case of the information recording medium 1 shown in FIG. 1, the read only area 30 and the recording and reproducing area 40 are disposed in the inner circumference side and the outer circumference side respectively. However, their disposition can be inverted. These two areas are formed not so as to overlap with each other. In this case, these two areas are formed sequentially.

Further, in FIG. 1, the information recording medium 1 is composed of one read only area 30 and one recording and reproducing area 40. However, the information recording medium 1 can be composed of a plurality of read only areas and a plurality of recording and reproducing areas.

Figure 2:
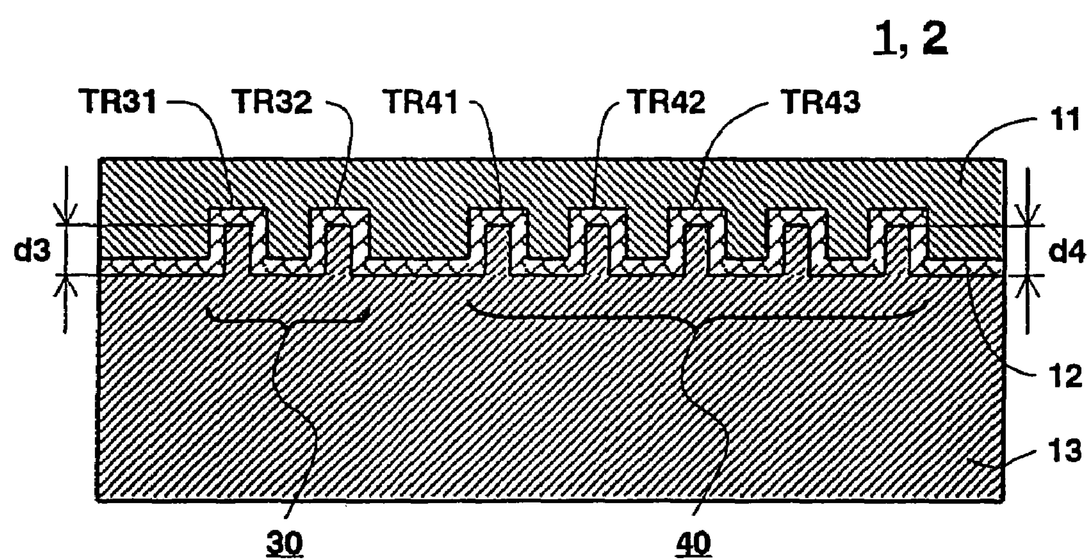
FIG. 2 is a cross sectional view of the information recording medium shown in FIG. 1 exhibiting a most fundamental configuration.

FIG. 2 is a cross sectional view of the information recording medium 1 shown in FIG. 1 and shows a most fundamental configuration of the information recording medium 1 according to the first embodiment of the present invention. In FIG. 2, the information recording medium 1 is composed of at least a substrate 13, a recording layer 12 and a light transmitting layer 11. On the surface of the substrate 13, that is, an interface between the substrate 13 and the recording layer 12, microscopic patterns corresponding to the read only area 30 and the recording and reproducing area 40 are formed without overlapping with each other. As shown in FIG. 2, tracks TR31 and TR32 are formed as a wobbling groove, which constitutes the read only area 30, and tracks TR41, TR42 and TR43 are formed as a wobbling groove, which constitutes the recording and reproducing area 40. The grooves in these two areas have a depth of d3 for the read only area 30 and d4 for the recording and reproducing area 40 respectively. It is acceptable that these two depths are identical or different from each other. However, they must be in a certain depth, which can obtain a certain range of push-pull output that will be explained later. The substrate 13, the recording layer 12 and the light transmitting layer 11 are formed in parallel with each other. Further, the recording layer 12 and the light transmitting layer 11 are continuously contacted with each other without being interrupted, wherein they cover whole areas of the read only area 30 and the recording and reproducing area 40.

The substrate 13 is a base, which has a function of supporting the recording layer 12 and the light transmitting layer 11 formed thereon mechanically. With respect to a material for the substrate 13, any one of synthetic resin, ceramic and metal can be used. With respect to a typical example of the synthetic resin, there is provided various kinds of thermoplastic resins and thermosetting resins such as polycarbonate, polymethyle methacrylate, polystyrene, copolymer of polycarbonate and polystyrene, polyvinyl chloride, alicyclic polyolefin and polymethyle pentene, and various kinds of energy ray curable resins such as UV ray curable resins, visible radiation curable resins and electron beam curable resins. They can be preferably used.

Further, it is also acceptable that these synthetic resins are mixed with metal powder or ceramic powder. With respect to a typical example of the ceramic, soda lime glass, soda aluminosilicate glass, borosilicate glass or silica glass can be used. With respect to a typical example of the metal, a metal plate such as aluminum that has no transparency can be used. A thickness of the substrate 13 is suitable to be within a range of 0.3 mm to 3 mm, desirably 0.5 mm to 2 mm due to necessity of supporting mechanically the information recording medium 1 in total. In a case that the information recording medium 1 is disciform, the thickness of the substrate 13 is desirable to be designed such that the total thickness of the information recording medium 1 including the substrate 13, the recording layer 12 and the light transmitting layer 11 becomes 1.2 mm, for the purpose of interchangeability with a conventional optical disc. A printing for indicating contents of the information recording medium 1 or a trademark can be printed on the surface of the substrate 13 opposite to the recording layer 12, if necessary.

The recording layer 12 has a function of reading out information, recording information or rewriting information and is a thin film layer that is constituted by a recording material having reflectivity of more than 5% at a wavelength λ. With respect to a material for the recording layer 12, a material that is represented by a phase-change material of which reflectivity or refractive index changes in a process of before and after recording, a magneto-optical material, which reproduces a change of Kerr rotation angle or a dye material of which refractive index or a depth changes in a process of before and after recording is used.

With respect to a typical example of the phase-change material, an alloy of element such as indium, antimony, tellurium, selenium, germanium, bismuth, vanadium, gallium, platinum, gold, silver, copper, aluminum, silicon, palladium, tin and arsenic can be used, wherein an alloy includes a compound such as oxide, nitride, carbide, sulfide and fluoride. Particularly, an alloy such as Ge—Sb—Te system, Ag—In—Te—Sb system, Cu—Al—Sb—Te system and Ag—Al—Sb—Te system is suitably used. These alloys can contain one or more elements as a trace of additive element within a range of more than 0.01 atomic % and less than 10 atomic % in total. Such an additive element is selected out of Cu, Ba, Co, Cr, Ni, Pt, Si, Sr, Au, Cd, Li, Mo, Mn, Zn, Fe, Pb, Na, Cs, Ga, Pd, Bi, Sn, Ti, V, Ge, Se, S, As, Ti, In and Ni. With respect to compositions of each element, for example, there is existed $Ge_2Sb_2Te_5$, $Ge_1Sb_2Te_4$, $Ge_8Sb_{69}Te_{23}$, $Ge_8Sb_{74}Te_{18}$, $Ge_5Sb_{71}Te_{24}$, $Ge_5Sb_{76}Te_{19}$, $Ge_{10}Sb_{68}Te_{22}$ and $Ge_{10}Sb_{72}Te_{18}$ and a system adding a metal such as Sn and In to the Ge—Sb—Te system as for the Ge—Sb—Te system.

Further, as for the Ag—In—Sb—Te system, there is existed $Ag_4In_4Sb_{66}Te_{26}$, $Ag_4In_4Sb_{64}Te_{28}$, $Ag_2In_6Sb_{64}Te_{28}$, $Ag_3In_5Sb_{64}Te_{28}$, $Ag_2In_6Sb_{66}Te_{26}$, and a system adding a metal or semiconductor such as Cu, Fe and Ge to the Ag—In—Sb—Te system.

With respect to an actual example of the magneto-optical material, there is existed alloys composed of an element such as terbium, cobalt, iron, gadolinium, chromium, neodymium, dysprosium, bismuth, palladium, samarium, holmium, praseodymium, manganese, titanium, palladium, erbium, ytterbium, lutetium and tin, wherein an alloy includes a compound such as oxide, nitride, carbide, sulfide and fluoride. Particularly, constituting an alloy of a transition metal, which is represented by TbFeCo, GdFeCo and DyFeCo, with rare earth element is preferable.

Moreover, using an alternate lamination layer of cobalt and platinum can constitute the recording layer 12.

With respect to a dye material, porphyrin dye, cyanine dye, phthalocyanine pigment, naphthalocyanine pigment, azo dye, naphthoquinone dye, fulgide dye, polymethine dye and acridine dye can be used.

An auxiliary material can be contained in or laminated on the recording layer 12 so as to increase recording or reproducing ability other than a material for recording. For example, a dielectric material such as ZnS, SiO, ZnSSiO, GeN, SiN, SiC, AlN, MgF, ZrO and InO can be laminated on the recording material. Consequently, a number of rewritings and luminous energy for reproducing can be improved.

Further, in order to increase luminous energy for reproducing extremely, a light reflective film, that is, a heat sink made by aluminum, gold, silver or titanium can be laminated on the recording layer 12 together with a dielectric material.

Furthermore, in order to conduct high-density recording and reproducing, a well-known super-resolution film or so-called mask film can be laminated on the recording layer 12 together with the light reflective film.

Optical recording or reproducing is conducted to the recording layer 12. A laser beam having a wavelength of λ nm, which is converged by an objective lens having a numerical aperture NA, is transmitted through the light transmitting layer 11. In other words, the light transmitting layer 11 has a function of conducting the converged reproducing light to the recording layer 12 with maintaining the reproducing light under a condition of lesser optical distortion. A material having a light transmittance of more than 70%, for example, desirably more than 80% with respect to the reproducing light having the wavelength λ can be suitably used for the light transmitting layer 11.

Further, the light transmitting layer 11 has a predetermined refractive index "n" at the wavelength λ. It is desirable for the light transmitting layer 11 that the refractive index "n" is within a range of 1.4 to 1.7 with respect to interchangeability with a conventional optical disc, more desirably, the refractive index "n" is within a range of 1.45 to 1.65.

Furthermore, if birefringence of a material is assigned to be less than 100 nm, desirably less than 50 nm, more desirably less than 35 nm at double paths, a change of reproduction output can be suppressed sufficiently. Materials having such a characteristic such as polycarbonate, polymethyle methacrylate, cellulose triacetate, cellulose diacetate, polystyrene, copolymer of polycarbonate and polystyrene, polyvinyl chloride, alicyclic polyolefin and polymethyle pentene can be used for the light transmitting layer 11.

Moreover, it can be acceptable for the light transmitting layer 11 to have a function of protecting the recording layer 12 mechanically and chemically. With respect to materials having such a function, a material having higher stiffness like, for example, transparent ceramics such as soda lime glass, soda aluminosilicate glass, borosilicate glass and silica glass, thermosetting plastics, energy ray curable resins such as UV ray curable resins, visible radiation curable resins and electron beam curable resins, moisture curable resins and plural liquid mixture curable resins can be suitably used for the light transmitting layer 11. With respect to a thickness of the light transmitting layer 11, it is desired to be less than 2 mm, particularly, less than 1.2 mm so as to reduce birefringence or optical anisotropy.

In a case that an objective lens having a numerical aperture NA of more than 0.7 is installed in a reproducing apparatus for an information recording medium and used, a thickness of the light transmitting layer 11 is desired to be less than 0.4 mm from a point of view that optical aberration can be suppressed when the information recording medium 1 is slanted with respect to a reproducing light beam or recording light beam. Particularly, in a case that the NA is more than 0.85, the thickness is desirable to be less than 0.12 mm. From another point of view of preventing the recording layer 12 from a scratch, it is desired to be more than 0.02 mm. In other words, the thickness is desired to be within a range of 0.02 mm to 0.12 mm if the NA is more than 0.85.

Further, scattering of thickness in one plane shall be ±0.003 mm at the maximum, desirably less than ±0.002 mm, more desirably less than ±0.001 mm.

Furthermore, it is acceptable for the light transmitting layer 11 to be constituted by not only a single layer as shown in FIG. 2 but also lamination of a plurality of layers having similar functions.

More, a commonly known antistatic layer can be formed on the surface of the light transmitting layer 11 opposite to the recording layer 12 so as to reduce dust that attaches to the surface of the light transmitting layer 11.

Moreover, for a purpose of reducing affection of accidental collision with the light transmitting layer 11 caused by an objective lens that constitutes a pickup of a reproducing apparatus or a recording apparatus, a hard coat layer and a lubricative layer can be formed on the light transmitting layer 11 on the opposite side to the recording layer 12 although the hard coat and lubricative layers are not shown in drawings.

With respect to an actual material for the hard coat layer, a resin, which transmits more than 70% of light having wavelength λ, such as thermosetting resins, various energy ray curable resins (including UV ray curable resins, visible radiation curable resins and electron beam curable resins), moisture curable resin, plural liquid mixture curable resin and thermoplastic resin containing solvent can be used.

The hard coat layer mentioned above is desirable to exceed a certain value of the "scratch test by pencil" regulated by the Japanese Industrial Standard (JIS) K5400 in consideration of abrasion resistance of the light transmitting layer 11. In consideration of that a hardest material of the objective lens is glass, a value of the "scratch test by pencil" for the hard coat layer is most preferable to be more than the "H" grade. If the test value is less than the "H" grade, dust that is caused by scraping the hard coat layer is remarkably generated. Consequently, an error rate is deteriorated abruptly. Thickness of the hard coat layer is desirable to be more than 0.001 mm in consideration of shock resistance, more desirable to be less than 0.01 mm in consideration of warp of an total information recording medium 1.

With respect to other materials for the hard coat layer, an element, which transmits more than 70% of light having a wavelength λ and has a value of the "scratch test by pencil" of more than the "H" grade, such as carbon, molybdenum and silicon, and their alloy that includes composition such as oxide, nitride, sulfide, fluoride and carbide can be used, wherein its film thickness is within a range of 1 nm to 1000 nm.

With respect to an actual material for the lubricative layer, liquid lubricant of which surface energy is adjusted by modifying hydrocarbon macromolecule with silicon and fluorine can be used. Thickness of the lubricative layer is desirable to be within a range of 0.1 nm to 10 nm approximately.

A label printing can be applied on the surface of the substrate 13 on the opposite side to the recording layer 12 although the label printing is not shown in any drawings. Various energy ray curable resins containing pigment and dye such as UV ray curable resins, visible radiation curable resins and electron beam curable resins can be used suitably for the label printing. Thickness of the label printing is desirable to be more than 0.001 mm in consideration of visibility of the printing, more desirable to be less than 0.05 mm in consideration of warp of the total information recording medium 11. With respect to a printing method, a screen printing method and an offset printing method can be used.

An information recording medium 1 can be installed in a cartridge so as to improve ability of loading the information recording medium 1 into a reproducing apparatus and improve protectiveness of the information recording medium 1 while loading and unloading.

A data that is recorded in an information recording medium 1 according to the present invention as a permanent data in a wobbling groove and its recording method is explained next.

In a read only area 30 of an information recording medium 1 according to the present invention, a control data is embedded so as to initiate reading out when loading the information recording medium 1 into a player or initiating user recording into a recording and reproducing area 40. In other words, the control data is a specific code data that is at least selected out from copyright related information, a key for encrypting, a key for deciphering, encrypted data, recording permission code, recording refusal code, reproduction permission code, reproduction refusal code, serial number, lot number, control number, manufacturer information, classification of the information recording medium, size of the information recording medium, ideal recording linear density of the information recording medium, ideal linear velocity of the information recording medium, track pitch of the information recording medium (at least one of P3 and P4 that will be depicted later), recording strategy information, reproduction power information and commonly known lead-in data. The specific code data is such a data, which is described by the decimal number system or the hexadecimal notation and converted into the binary number system that includes a BCD (Binary-Coded Decimal) code and a gray code.

Further, the specific code data is recorded geometrically in the read only area 30 by wobbling a groove through any one modulation method of the frequency-shift keying, phase-shift keying and amplitude-shift keying methods. A wobbling groove can be formed in any one shape of line, coaxial and spiral. Particularly, in a case that a wobbling groove constituting the read only area 30 is in a spiral shape, the control data can be recorded by either the CAV (Constant Angular Velocity) method or the CLV (Constant Linear Velocity) method.

Furthermore, the ZCAV (Zone Constant Angular Velocity) method or the ZCLV (Zone Constant Linear Velocity) method can also be adopted by forming zones that vary by radius, wherein velocity control varies by each zone. Data is recorded in a wobbling shape of groove and not recorded by a pit array, so that the data can not be modified permanently.

Moreover, the control data can contain a location data or a clock information, and further can contain an error correction code so as to reduce an error of reading out data.

According to the present invention, a location data, which conducts readout all the time when a user recording in the recording and reproducing area 40 is initiated, are embedded in the recording and reproducing area 40 of the information recording medium 1. The location data is one of a data that is at least selected out from an absolute address that is allocated to the whole area of the recording and reproducing area 40, a relative address that is allocated to a partial area, a track number, a sector number, a frame number, a field number, time information and an error correction code. The location data is such a data that is described by, for example, the decimal number system or the hexadecimal notation and converted into the binary number system that includes a BCD code and a gray code.

Further, the location data is recorded geometrically in the recording and reproducing area 40 by wobbling a groove through any one modulation method of the frequency-shift keying, phase-shift keying and amplitude-shift keying methods.

Furthermore, in a case that a location data is also recorded in the read only area 30, it is acceptable to the location data that the location data is continuous or discontinuous with a location data to be recorded in the recording and reproducing area 40.

More, a part of contents of control data that is recorded in the read only area 30 can be recorded in the recording and reproducing area 40 in addition to a location data to be recorded in the recording and reproducing area 40.

A wobbling groove can be formed in any one shape of line, coaxial and spiral. Particularly, in a case that a wobbling groove constituting the read only area 30 is in a spiral shape, the control data can be recorded by either the CAV method or the CLV method.

Further, the ZCAV method or the ZCLV method can also be adopted by forming zones that vary by radius, wherein velocity control varies by each zone.

With respect to the modulation methods of frequency-shift keying, phase-shift keying and amplitude-shift keying, they will be detailed later.

The information recording medium 1 is complemented with respect to a plane structure hereinafter.

A plane structure of the information recording medium 1 is at least composed of the read only area 30 and the recording and reproducing area 40 as shown in FIG. 1. These areas have a plane structure shown in FIG. 3.

Figure 3:
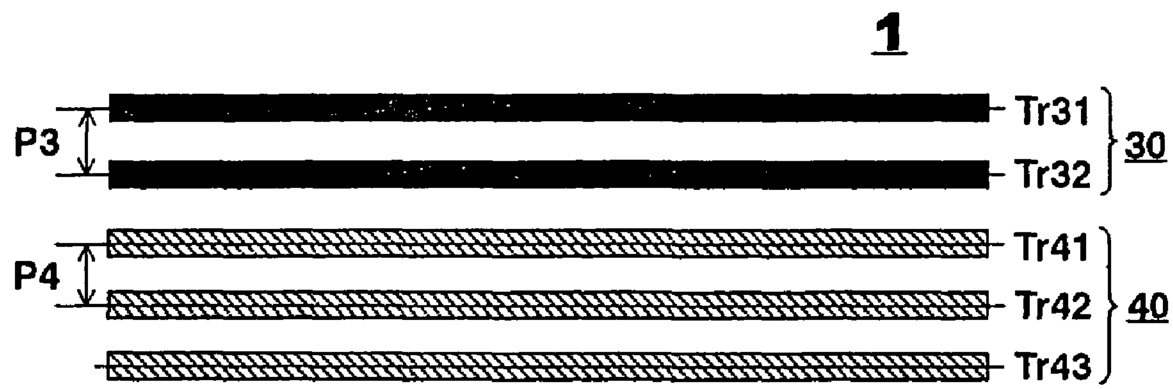
FIG. 3 is an enlarged plan view of the information recording medium shown in FIG. 2 exhibiting a vicinity of boundary area between a read only area and a recording and reproducing area.

FIG. 3 is an enlarged plan view of the information recording medium 1 shown in FIG. 2 exhibiting a vicinity of boundary area between the read only area 30 and the recording and reproducing area 40. In FIG. 3, tracks Tr31 and Tr32, which are a part of tracks constituting the read only area 30, and tracks Tr41, Tr42 and Tr43, which are a part of tracks constituting the recording and reproducing area 40, are exhibited representatively. A plurality of tracks that constitute the read only area 30 is a groove and a control data is recorded by a wobbling groove although the wobbling groove is not illustrated in FIG. 3. A track pitch between center axes of each track is P3, wherein the track pitch P3 is illustrated in FIG. 3 as a distance between the tracks Tr31 and Tr32.

Further, a plurality of tracks that constitute the recording and reproducing area 40 is a groove and a location data is recorded therein by a wobbling groove. However the wobbling is not illustrated in FIG. 3. A track pitch between center axes of each track is P4, wherein the track pitch P4 is illustrated in FIG. 3 as a distance between the tracks Tr41 and Tr42.

Values of these track pitches P3 and P4 are P3$\leqq\lambda$/NA and P4$\leqq\lambda$/NA respectively. It is acceptable to the track pitches P3 and P4 that they are an identical value to or different values from each other. In a case of using a violaceous laser beam and a pickup having high NA, for example, the track pitches P3 and P4 are configured by P3$\leqq$476 nm and P4$\leqq$476 nm respectively with assigning that $\lambda$=405 nm and NA=0.85.

A space between the read only area 30 and the recording and reproducing area 40, that is, a distance between the track Tr32 and the track Tr41 shown in FIG. 3 is less than 25 μm as a minimal essential condition so as to obtain continuity of tracking.

Further, a desirable space between the read only area 30 and the recording and reproducing area 40, that is, the distance between the tracks Tr32 and Tr41 shall be the same value as either P3 or P4. In a case that P3 and P4 is extremely different from each other, it is desirable for the distance to be assigned as an arbitrary value between P3 and P4, particularly, it is more desirable for the distance to be assigned as an average value of P3 and P4.

Most desirably, each of the spaces between the read only area 30 and the recording and reproducing area 40, P3 and P4 is exactly the same value.

In the sense of minimizing impact when traversing areas, it is acceptable to provide a transition area that is composed of a groove of more than one track between the read only area 30 and the recording and reproducing area 40.

Further, in the transition area, it is acceptable to a track pitch that the track pitch changes continuously or changes in multiple steps from P3 to P4.

Furthermore, a groove that constitutes the transition area is essentially not recorded with data or not wobbled. However, it is acceptable to the groove that the groove is a wobbling groove, which is recorded with a null data, that is, a data of “0” (zero) or a dummy data.

A wobbling groove amplitude of each area of the read only area 30 and the recording and reproducing area 40 is formed with having a relationship such as less than a pitch that constitutes each area. In other words, a wobbling groove amplitude of the read only area 30 is less than P3 and a wobbling groove amplitude of the recording and reproducing area 40 is less than P4.

A plane constitution of an information recording medium 2 is explained next when a user initiates recording on the information recording medium 1.

Figure 4:
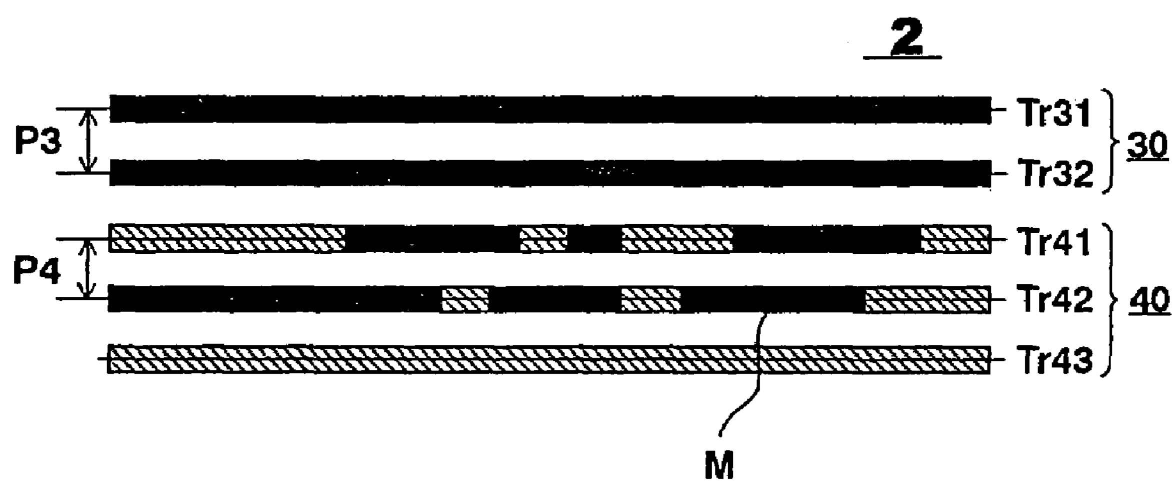
FIG. 4 is an enlarged plan view of an information recording medium recorded with a record mark showing a vicinity of boundary area between a read only area and a recording and reproducing area according to the first embodiment of the present invention.

FIG. 4 is an enlarged plan view of an information recording medium 2 showing a vicinity of boundary area between a read only area 30 and a recording and reproducing area 40, wherein the information recording medium 2 exhibits a state after a user initiates recording on the information recording medium 1 shown in FIG. 3. In other words, the user makes recording only in the recording and reproducing area 40 of the information recording medium 1. FIG. 4 representatively shows a state that is recorded by a phase change recording method, particularly, by a so-called “high to low” method. In FIG. 4, a user data is recorded only on the tracks Tr41 and Tr42 in the recording and reproducing area 40 and a plurality of record marks M is recorded on the tracks Tr41 and Tr42. The “high to low” method means a method such that a recording layer 12 is crystals and high in reflectivity when not recorded while the recording layer 12 is amorphous and low in reflectivity when recorded. As mentioned above, the user data is recorded by forming a record mark M intermittently on a part of or all of the recording and reproducing area 40 out of the read only area 30 and the recording and reproducing area 40. Consequently, the information recording medium 2 is completed.

A signal method that is used for user data recording is explained next. A modulation signal of so-called a (d, k) code, for example, can be used for the user data recording. Either a fixed length code or a variable length code can be applied for a (d, k) modulation signal.

With respect to an example of a (d, k) modulation in a fixed length code, there is provided the EFM (Eight to Fourteen Modulation) method, the EFM plus (8–16 modulation) method and the (D8–15 modulation) method that is disclosed in the Japanese Patent Application Laid-open Publication No. 2000-286709, wherein it is defined that d=2 and k=10 respectively.

Further, in a case that d=1 and k=9 respectively, there is provided the (D4, 6 modulation) method that is disclosed in the Japanese Patent Application No. 2001-080205 (filed by the applicant, Victor Company of Japan, Ltd.) Furthermore, in a case that d=1 and k=7 respectively, there is provided the (D1, 7 modulation) method that is disclosed in the Japanese Patent Application Laid-open Publication No. 2000-332613.

With respect to an example of a (d, k) modulation in a variable length code, there is provided the (17PP modulation) method that is disclosed in the Japanese Patent Application Laid-open Publication No. 11-346154/1999, wherein it is defined that d=1 and k=7 respectively.

A push-pull output, which is a major point of the information recording medium 1 according to the present invention, is explained next. The information recording medium 1 of the present invention is composed of at least the read only area 30 and the recording and reproducing area 40 as mentioned above. A groove shape of each area can be optimized in accordance with their purposes. In other words, a groove shape is optimized so as to increase an output of control data in the read only area 30. In the recording and reproducing area 40, a groove shape is optimized so as to initiate user recording together with reading a location data and so as to minimized a reproduction error rate at the moment. At this moment, a push-pull signal output T3 that is reproduced from the read only area 30 and another push-pull signal output T4 that is reproduced from the recording and reproducing area 40 shall be defined so as to satisfy equations such as T3≧=0.1 and T4≧0.1, and further so as to satisfy a relationship between T3 and T4 such as 1.5≧T3/T4≧0.5. A push-pull output hereupon is a differential signal in each area when traversing a groove.

Figures 5, 6:
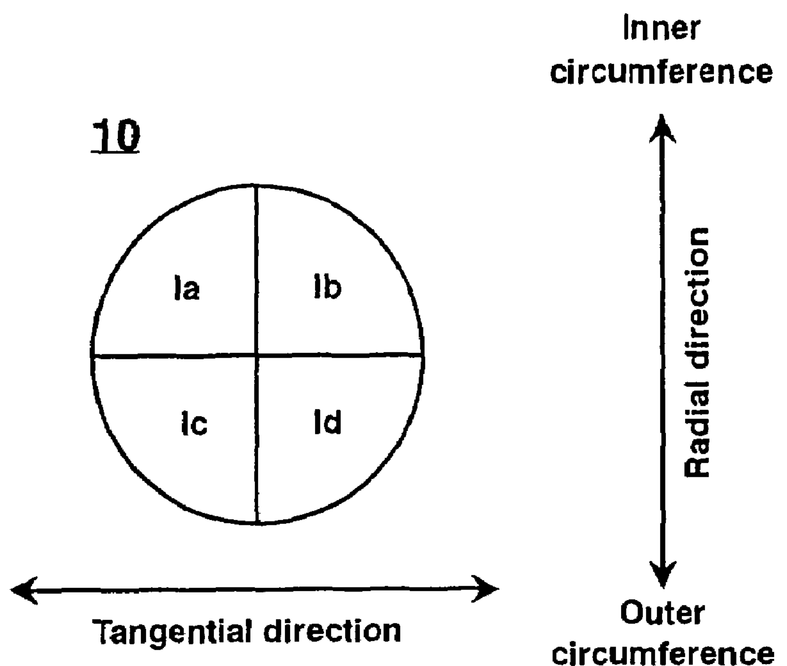
FIG. 5 is a plan view of a 4-division detector used for recording and reproducing the information recording medium according to the present invention.
FIG. 6 is a table exhibiting relationship between a push-pull output T3 and tracking performance of the information recording medium according to the first embodiment of the present invention.

FIG. 5 is a diagrammatic plan view of a 4-division detector 10 that is used in a pickup of a recording and reproducing apparatus for an information recording medium in disciform. With referring to FIG. 5, a method of measuring a push-pull output is explained. In FIG. 5, a vertical line or the Y-axis is a radial direction of an information recording medium in disciform, that is, a direction of traversing a groove and a horizontal line or the X-axis is a tangential direction or a track direction of the information recording medium. The relation between vertical and horizontal directions corresponds to that of the information recording medium 1 shown in FIG. 3 if the information recording medium 1 is in disciform.

In FIG. 5, reproduction outputs of the 4-division detector 10 are Ia, Ib, Ic and Id respectively. A difference between the inner circumference side and the outer circumference side, that is, |(Ia+Ib)−(Ic+Id)| is measured by the AC (Alternating Current) coupling method, and then a total sum, that is |(Ia+Ib+Ic+Id)| is measured by the DC (Direct Current) coupling method. A push-pull output T is a ratio of the difference to the total sum. The push-pull output T is defined as T=|(Ia+Ib)−(Ic+Id)|/|(Ia+Ib+Ic+Id)|. By this definition, a push-pull output T3 of the read only area 30 and a push-pull output T4 of the recording and reproducing area 40 is measured respectively.

In order to enable an area traversing reproduction across the read only area 30 and the recording and reproducing area 40, the inventor of the present invention produces an information recording medium 1 in disciform in which those push-pull outputs can be obtained by adjusting depths d3 and d4 of each area and examines actual traversing performance, and then a suitable range of push-pull output is obtained. The result of examination is exhibited in FIGS. 6, 7 and 8.

FIG. 6 is a table exhibiting the result of examination in stability of tracking in the read only area 30 when a push-pull output T3 of the read only area 30 is changed. The examination is performed in the surrounding of a clean room and under a condition of a disc eccentricity that is sufficiently restricted. As shown in FIG. 6, tracking is completely impossible when the push-pull output T3 is less than 0.08.

FIG. 7 is a table exhibiting the result of examination in stability of tracking in the recording and reproducing area 40 when a push-pull output T4 of the recording and reproducing area 40 is changed. The examination is performed in the surrounding of a clean room and under a condition of a disc eccentricity that is sufficiently restricted. As shown in FIG. 7, tracking is completely impossible when the push-pull output T4 is less than 0.08 as same as the result of the read only area 30.

FIG. 8 is a table exhibiting the result of examination in stability of tracking during 2-area traversing reproduction when the push-pull output T3 of the read only area 30 is changed together with the push-pull output T4 of the recording and reproducing area 40. The examination is performed under a condition of a disc eccentricity that is sufficiently restricted. As shown in FIG. 8, it is apparent that the 2-area traversing reproduction is possible only within a range of 1.5≧T3/T4≧0.5. A reason why the push-pull output ratio of two areas must be less than a predetermined value is that servo will not follow if difference of push-pull outputs is excessively large and resulted in out of tracking. In other words, it is caused by that there is a limit in a dynamic range of player servo circuit.

In summarizing the result of examinations mentioned above, a condition of enabling the 2-area traversing reproduction is as follows:

T3≧0.1,
T4≧0.1 and
1.5≧T3/T4≧0.5.

The above relations are essential to be satisfied simultaneously.

The above-mentioned examinations are conducted under an ideal condition such that eccentricity of the information recording medium 1 in disciform is sufficiently restricted. However, a center hole of an actual mass-produced disc is not uniform in accuracy. In consideration of that eccentricity of the information recording medium 1 in disciform is approximately within a range of 40 μm to 70 μm according to the current technology, a desirable range of stabilizing the area traversing reproduction more is as follows:

T3≧0.15,
T4≧0.15 and
1.45≧T3/T4≧0.6.

The above relations are essential to be satisfied simultaneously.

Further, the above-mentioned examinations are conducted under the surrounding of a clean room. However, actually mass-produced disc and player are handled in the general atmosphere. In consideration of that an information recording medium 1 is attached with dust, a desirable range of stabilizing the area traversing reproduction furthermore is as follows:

$T3 \geqq 0.20$, $T4 \geqq 0.20$ and $1.4 \geqq T3/T4 \geqq 0.7$.

The above relations are essential to be satisfied simultaneously.

Furthermore, the push-pull outputs T3 and T4 are defined by the track pitches P3 and P4, groove widths of the read only area 30 and the recording and reproducing area 40 and the groove depths d3 and d4 respectively.

Figure 9:
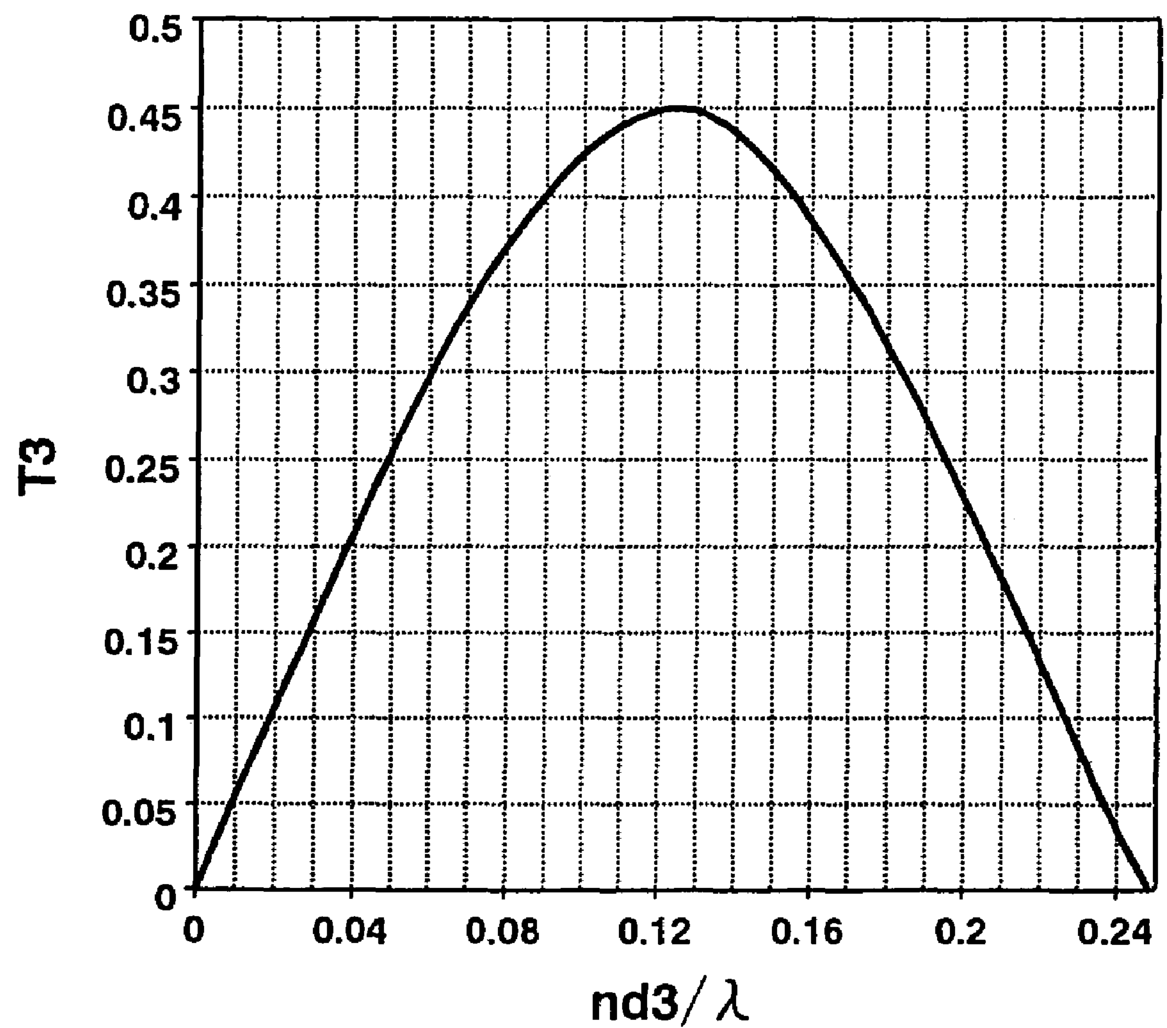
FIG. 9 is a graph showing relationship between a groove depth in a read only area and a push-pull output T3 of the information recording medium according to the present invention.

FIG. 9 is a graph showing relationship between a groove depth and a push-pull output T3 in the read only area 30 with defining that λ is 405 nm, NA is 0.85, a refractive index "n" is 1.6, P3 is 0.32 μm and a groove width is 0.16 μm. The graph is shown by changing only the groove depth d3. Parameters nd3/λ and T3 are allocated on the X-axis and the Y-axis respectively. In FIG. 9, T3 is maximum at the point of nd3/=0.125 and T3 is within a range of 0 to 0.45. With respect to a push-pull output T4 in the recording and recording area 40, a trend of graph is identical to that of T3.

Accordingly, under the above mentioned parameters, a most suitable range for T3 and T4 is as follows:

$0.45 \geqq T3 \geqq 0.20$, $0.45 \geqq T4 \geqq 0.20$ and $1.4 \geqq T3/T4 \geqq 0.7$.

Further, in view of the relationship between the push-pull output and the groove depth shown in FIG. 9, it should be understood that the most suitable range mentioned above can be realized by changing each groove depth of d3 and d4 in the read only area 30 and the recording and reproducing area 40 respectively.

Furthermore, it should also be understood that the most suitable range can be realized by changing each track pitch of P3 and P4 in the read only area 30 and the recording and reproducing area 40 respectively. If the track pitch P3 is assigned to be a relatively large value, for example, a value of the push-pull output T3 can be increased, wherein their relations can be arranged reversely. The push-pull output can be optimized by making use of characteristics of a data to be recorded in the read only area 30 and the recording and reproducing area 40.

Figure 10:
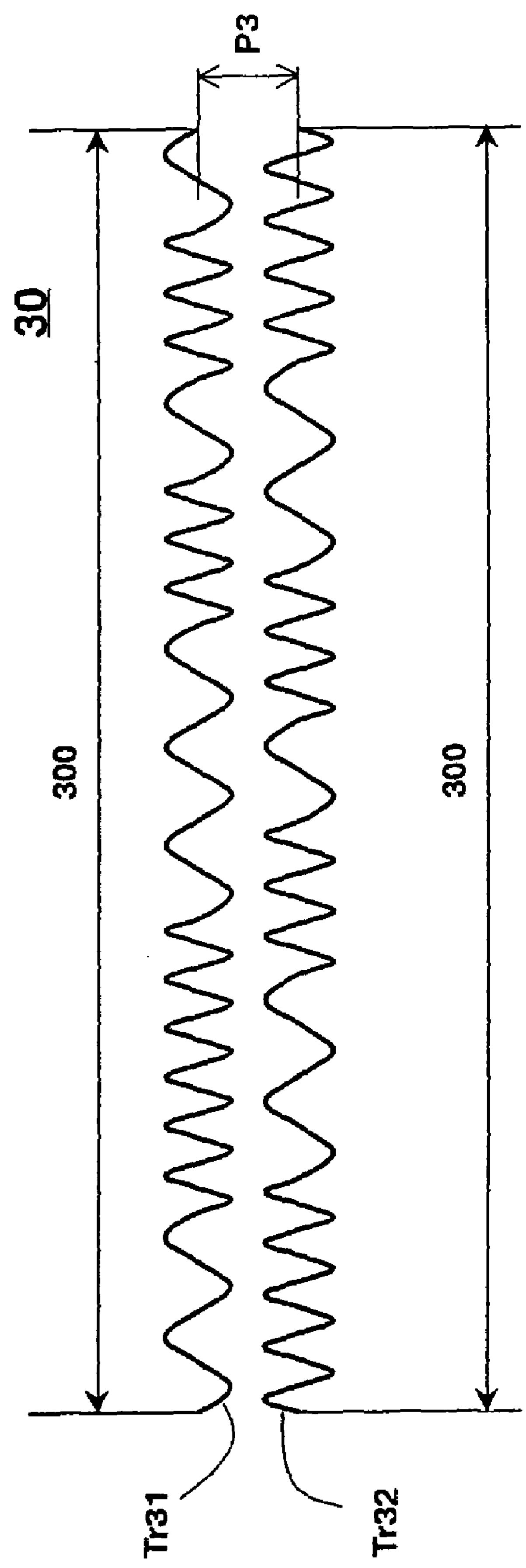
FIG. 10 is a plan view of a read only area of the information recording medium according to the present invention.

FIG. 10 shows wobbling grooves of tracks Tr31 and Tr32 in a read only area 30. In FIG. 10, a control data 300 is recorded in the read only area 30 in a shape of wobbling groove. As mentioned above, the control data 300 is read out when an information recording medium 1 is loaded or a user recording is initiated. Although a recording capacity of the control data 300 itself is relatively low, a same data is recorded 100 times to 1000 times repeatedly so as to be read in rapidly. Consequently, the control data 300 is written in a track as long as at least more than one circle in the information recording medium 1. In such a read only area 30, a data in the track Tr31 interferes with another data in the track Tr32, that is, the data in the track Tr31 makes crosstalk to the other data in the track Tr32, so that it is desirable for the track pitch P3 to be assigned in a larger value. In other words, the track pitch P3 can be assigned to be larger than the track pitch P4 as far as the above-mentioned range is satisfied. Therefore, by assigning that d4=d3=22 nm, P4=320 nm and P3=350 nm, for example, a control data 300 that is less in crosstalk can be obtained with maintaining stability of continuous reproduction. In order to increase an output when reproducing, the groove depth d3 can be assigned to be larger than the groove depth d4. In other words, by assigning that P4=320 nm, P3=350 nm, d4=22 nm and d3=28 nm, for example, a control data 300 that is less in crosstalk can be obtained with maintaining stability of continuous reproduction.

Figure 11:
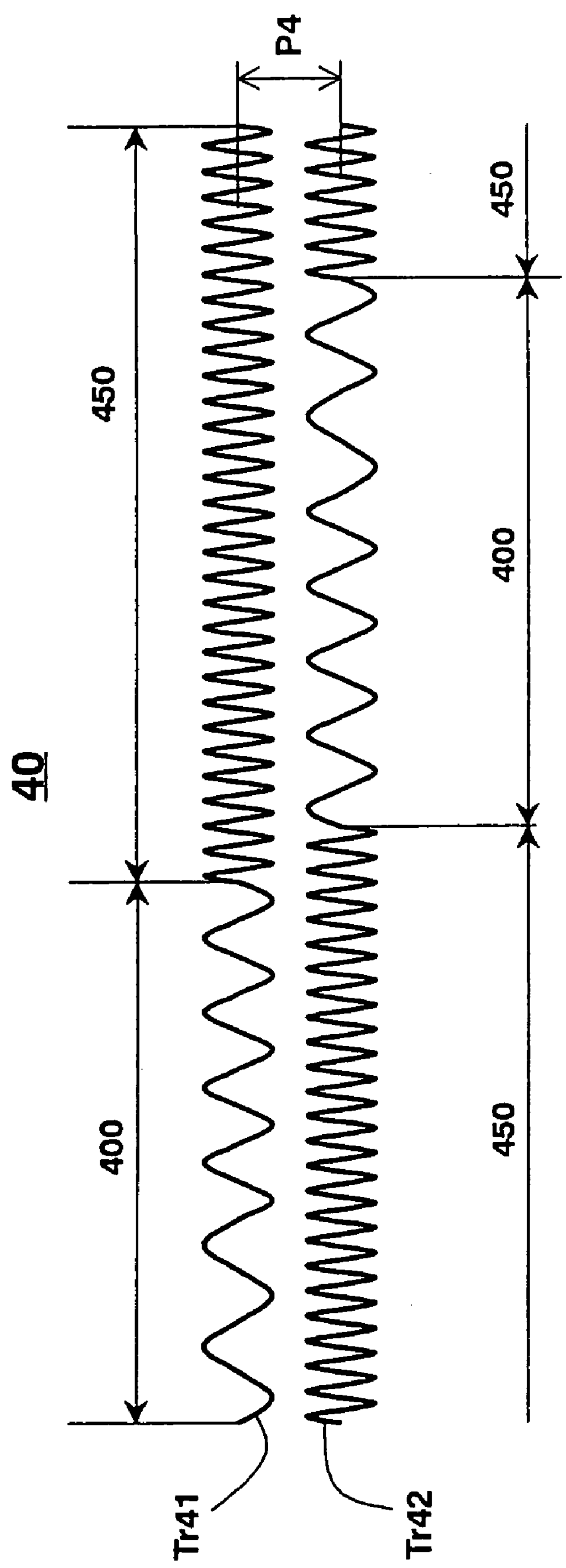
FIG. 11 is a plan view of a recording and reproducing area of the information recording medium according to the present invention.

FIG. 11 shows wobbling grooves of tracks Tr41 and Tr42 in a recording and reproducing area 40. In FIG. 11, a location data 400 and a clock data 450 is recorded in the recording and reproducing area 40 in a shape of wobbling groove. As mentioned above, the location data 400 is read out when a user recording is initiated and during a recording. A recording capacity of the location data 400 itself is relatively low.

Further, it is essential that an accurate reference clock is produced during a recording, so that the clock data 450 is allocated in a gap of the location data 400. The clock data 450 is a sinusoidal wave in a single frequency, for example, and a length of the clock data 450 is more than 10 times longer than that of the location data 400. Consequently, as shown in FIG. 11, the location data 400 is extremely low in a probability of overlapping with other location data 400 in an adjacent track, so that a data hardly interferes with others or hardly makes crosstalk to others. In other words, the track pitch P4 can be assigned to be relatively small and resulted in realizing an information recording medium 1 in high density.

With respect to a groove depth d4, the groove depth d4 can be assigned to be relatively large so as to increase outputs of the location data 400 and the clock data 450 when reproducing. However, in view of a user recording, a shallower groove depth d4 can increase a modulation factor and decrease an error rate. Therefore, a relatively small figure is suitable for the groove depth d4.

Several points to be considered when designing the information recording medium 1 are explained above. However, it should be understood that the track pitches P3 and P4, the groove depths d3 and d4 and groove widths of the read only area 30 and the recording and reproducing area 40 are determined by considering parameters such as crosstalk and reproduction output of a control data 300, crosstalk and reproduction outputs of a location data 400 and a clock data 450 and error rate of a user data totally. In this case, if the push-pull outputs T3 and T4 are within a predetermined range according to the present invention, a traversing across two areas can be performed smoothly.

In such an information recording medium 1 having the above mentioned configuration, a track such as Tr31 and Tr32, for example, is arranged on either one of so-called a groove G and a land L. The groove G is a name of representing a groove that is close to a surface, which is irradiated with an incident light beam, and the land L is a name of representing another groove that is far from the surface according to the Japanese Industrial Standard JIS-X6271-1991, for example. It is studied which of a groove G and a land L is more suitable for a track to be arranged. The subject is closely related to another subject which of a groove G and a land L is more suitable for a user to record on and reproduce from a recording layer 12 as well as for a recording of a control data and a location data. After studying from such a viewpoint, it is found that recording in a groove G selectively a user recording into the recording layer 12 can reduce reproduction jitter and a error rate to a lower figure, and further exhibit an excellent repetition performance of recording. It is caused by that the groove G is closer to a laser beam than the land L, so that heat generated by irradiation of the laser beam accumulates in the groove G more than the land L. As a result, recording sensitivity in the groove G becomes higher. Further, a shape of record mark that is formed in the groove G becomes uniform. Consequently, resulted in that an ideal recording can be realized in the groove G.

On the other hand, in a case of recording such a record mark in a land L, heat generated by irradiation of the laser beam can release easier than in a groove G, so that a record mark formed in the land L becomes uneven. Consequently, an ideal recording can not be realized in the land L.

Accordingly, as shown in FIG. 2, a track such as Tr31 and Tr32 in the read only area 30 is desirable to be allocated in a side that is close to the light transmitting layer 11.

In addition thereto, the tracks Tr31 and Tr32 in the read only area 30 are desirable to be allocated in a groove G that is close to the light transmitting layer 11 from the viewpoint of continuity of reproduction over to the recording and reproducing area 40.

A recording method of a control data and a location data to be recorded in an information recording medium 1 of the present invention is explained next.

As mentioned above, a data such as a control data 300 and a location data 400 are recorded geometrically by a wobbling groove in the read only area 30 and the recording and reproducing area 40 by using any one method of the frequency-shift keying method, the phase-shift keying method and the amplitude-shift keying method. It is acceptable that modulation methods for the control data 300 and the location data 400 can be different from each other. However, the same modulation method is desirable.

Further, a data can be either a binary data or a multi-valued data. Hereinafter with defining that a data is a binary data, the methods of the frequency-shift keying method, the phase-shift keying method and the amplitude-shift keying method are explained.

Figure 12:
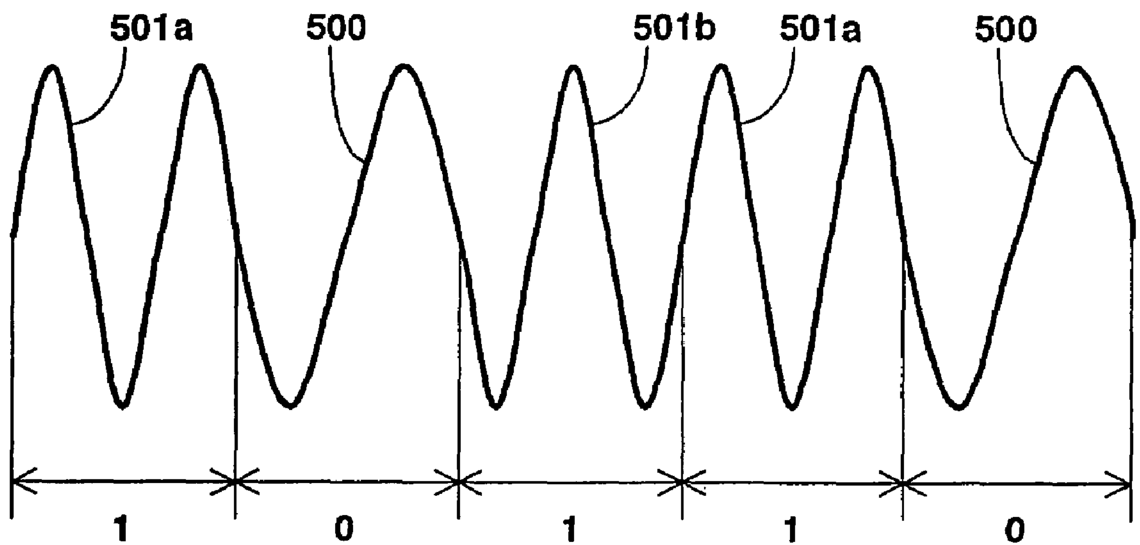
FIG. 12 is a waveform of digital date modulated by the frequency-shift keying method.

With respect to an actual recording by the frequency-shift keying method, a data is recorded geometrically by using a high frequency section and a low frequency section as shown in FIG. 12, for example.

FIG. 12 is a waveform of digital date (10110) that is recorded geometrically by the frequency-shift keying method. In FIG. 12, a control data 300 or a location data 400 is composed of a plurality of high frequency sections 501*a* and 501*b* (hereinafter generically referred to as high frequency section 501) and a plurality of low frequency sections 500. The high frequency section 501 and the low frequency section 500 corresponds to the data bit "1" and the other data bit "0" respectively. A frequency of a data bit is changed over at every one channel bit in response to an original digital data and every data bits are recorded in digital. A number of waves that constitute each frequency section is not limited to a specific number and one wave is constituted by more than one cycle. However, in order to detect a frequency accurately in a reproducing apparatus and to obtain a certain degree of transfer rate, each frequency section that corresponds to each data bit is desirably constituted by a number of waves within a range of one cycle to 1000 cycles, more desirably one cycle to 30 cycles in consideration of not being too redundant.

Further, each amplitude of the high frequency section 501 and the low frequency section 500 can be the same as each other. However, an amplitude ratio is not limited to a specific figure, an amplitude of the high frequency section 501 can be formed larger than that of the low frequency section 500 in consideration of a frequency response of a reproducing apparatus.

Furthermore, a physical length and an amplitude of a channel bit, which constitute the high frequency section 501 and the low frequency section 500, is not limited to a specific figure.

As shown in FIG. 12, each amplitude of the high frequency section 501 and the low frequency section 500 is identical to each other and the length or the period of the high frequency section 501 can be identical to that of the low frequency section 500. If the amplitude and the period is assigned as mentioned above, judging "0" or "1" while reproducing can be performed by a sufficient amplitude threshold value.

Further, a serial data can be read out by one time threshold value, so that a reproducing circuit can be simplified.

Furthermore, in a case that a jitter or fluctuation in the time axis direction is existed in a reproduced data, there is a merit of that such an identical amplitude and period can minimize affection by the jitter.

Moreover, if a code to be recorded is ideally symmetric, a total length of each period of the high frequency section 501 is equal to that of the low frequency section 500, and resulted in that no direct current component exists in a reproduced signal. In other words, decoding the data and servo controlling is released from excessive load, so that the ideally symmetrical code is advantageous for data processing and servo controlling.

A phase at a point of changing a channel bit from the high frequency section 501 to the low frequency section 500 or vise versa can be designated arbitrary. However, the high frequency section 501 and the low frequency section 500 can be arranged so as to prevent a phase jump and to maintain phase continuity at a channel bit changing-over point as shown in FIG. 12. In other words, a starting phase of the low frequency section 500 is selected so as to be a same phase direction at a point of connecting an end of the high frequency section 501 with a beginning of the low frequency section 500.

Further, the reverse relationship between the high frequency section 501 and the low frequency section 500 is the same situation, a starting phase of the high frequency section 501 is selected so as to be the same phase direction at a point of connecting an end of the low frequency section 500 with a beginning of the high frequency section 501. If a starting phase is selected as mentioned above, continuity of phase is maintained and power efficiency is improved. In addition thereto, a reproduction envelope becomes constant, so that a data error rate of an information recording medium 1 is improved.

Although selecting each frequency of the high frequency section 501 and the low frequency section 500 is optional, a frequency of the high frequency section 501 is required not to be extremely higher frequency than that of the lower frequency section 500 so as to eliminate interference with a frequency band that is used for recording a data by a user.

On the other hand, in order to improve a reproduction error rate of an address data, it is desired for each frequency of the high frequency section 501 and the low frequency section 500 that there is existed a certain degree of frequency difference between them and separation between them is kept excellently.

From the point of view mentioned above, it is desirable for a frequency ratio of the high frequency section 501 to the low frequency section 500, that is, a frequency ratio of high frequency to low frequency to be within a range of 1.09 to 5.0. In other words, a phase difference between two frequencies is desirable to be within a range of ±π/12 to ±π/0.75, that is, 360±15 degrees to 360±240 degrees. More desirable to be within a range of 360±16 degrees to 360±210 degrees and most desirable to be within a range of 360±16.5 degrees to 360±180 degrees.

In the above-mentioned phase difference range, particularly, in a case that a frequency ratio of high frequency to low frequency is defined to be 1.5 as shown in FIG. 12, two frequencies have a relation of shifting a phase of single frequency wave to −π/2.5 and +π/2.5 respectively. In other words, they have a relation of shifting a phase to 360±72 degrees. These frequencies can be expressed in that they are integral multiple of a single frequency, wherein the integral multiple is three times and twice, and the single frequency is 0.5. Consequently, it is advantageous for a demodulation circuit to be simplified.

Further, producing a clock signal becomes easier by a circuit having a window of 0.5.

Furthermore, a synchronous detection circuit can conduct demodulation. In this case, an error rate can be extremely reduced.

Actual recording processed by the phase-shift keying method is detailed next.

Figure 13:
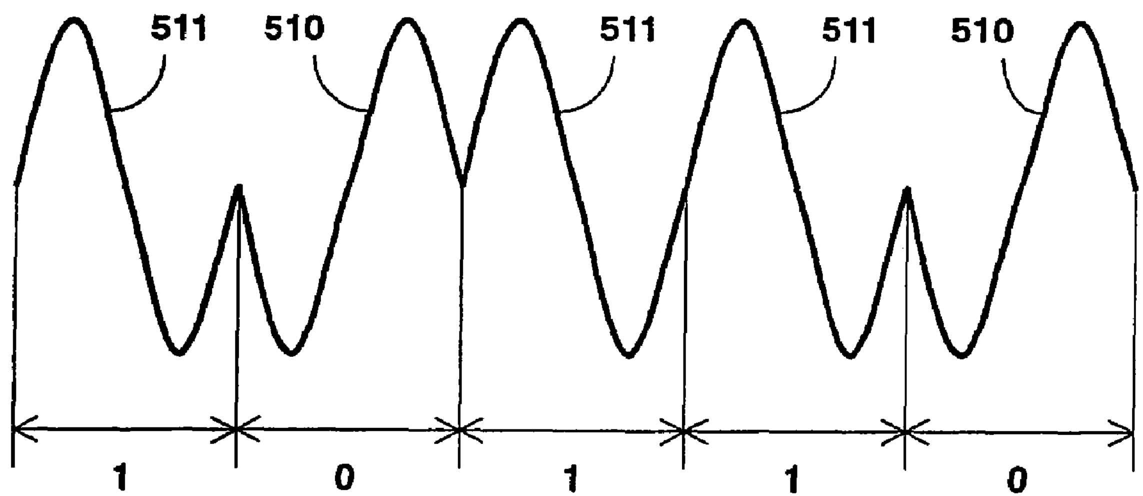
FIG. 13 is a waveform of digital date modulated by the phase-shift keying method.

FIG. 13 is a waveform of a digital date (10110) that is recorded geometrically by the phase-shift keying method. In FIG. 13, a control data 300 or a location data 400 is composed of a plurality of advancing phase sections 511 and a plurality of retreating phase sections 510. The advancing phase section 511 and the retreating phase section 510 corresponds to the data bit “1” and the other data bit “0” respectively. A phase of each data bit is changed over at every one channel bit in response to an original digital data and every data bits are recorded in digital.

More accurately, the advancing phase section 511 is exhibited by the sinusoidal wave of “sin 0” and the retreating phase section 510 is exhibited by the sinusoidal wave of “sin(−π)”. Each waveform of the advancing phase section 511 and the retreating phase section 510 shown in FIG. 13 is constituted by one cycle of the sinusoidal wave. However, phase difference between them is as many as π, so that they can be sufficiently separated and reproduced by the envelope detection method or the synchronous detection method.

As shown in FIG. 13, frequencies of the advancing phase section 511 and the retreating phase section 510 are the same as each other. A number of waves that constitute respective phase sections is not limited to a specific number and one wave is constituted by more than one cycle. However, in order to detect a phase accurately in a reproducing apparatus and to obtain a certain degree of data transfer rate, each phase section that corresponds to each data bit is desirably constituted by a number of waves within a range of one cycle to 1000 cycles, more desirably one cycle to 30 cycles in consideration of not being too redundant.

Each physical length of the advancing phase section 511 and the retreating phase section 510 can be either the same as or different from each other. With defining that each physical length is the same as each other, each one of serial data can be divided by a predetermined period of time or clock, so that a reproducing circuit can be simplified.

Further, in a case that jitter or fluctuation in the time axis direction exists in a reproduced data, there is merit in that such an identical physical length can minimize the effected jitter.

Furthermore, a digital data recorded geometrically by the phase-shift keying method can be reproduced by the commonly known synchronous detection circuit in a low error rate.

It is acceptable that each amplitude of the advancing phase section 511 and the retreating phase section 510 is either identical to or different from each other. However, it is desirable to be identical to each other in consideration of ease of reproduction.

With respect to a phase difference between the advancing phase section 511 and the retreating phase section 510, a limit of separation of the phase difference is obtained experimentally by applying to individual information recording mediums 1. It is confirmed that a phase difference can be separated up to π/8. In other words, a minimum phase difference can be set to within a range of π/8 to π, wherein π corresponds to a minimum phase difference of a binary data. In a case of multi-valued recording, a data from binary to hexadecimal value can be treated.

A single frequency to be a reference clock can be recorded by superimposing upon a control data 300 or a location data 400. In other words, a single frequency of which frequency is integral multiples (including one) of a fundamental frequency constituting respective phase sections or the fundamental frequency divided by a divisor of integral multiple can be superimposed upon the control data 300 or the location data 400 that is recorded by the phase-shift keying method. In the case of superimposing a clock frequency as mentioned above, separating frequencies can be realized by a commonly known band-pass filter. However, frequency difference between the fundamental frequency of the phase-shift keying method and the clock frequency is desired to be large. In a case that a fundamental frequency of the phase-shift keying method and a clock frequency is assigned to be “1” and “½” respectively, these frequencies are suitably separated and resulted in enabling to extract both data and clock stably.

Although it is not shown in any drawings, by using a saw-tooth waveform as a fundamental waveform, phase difference can be expressed by controlling each of rising edge and falling edge of the saw-tooth waveform independently. For example, it is acceptable that the data “1” and “0” are recorded geometrically with defining that the data “1” is a section having a gradually rising edge and a rapidly falling edge and the other data “0” is another section having a rapidly rising edge and a gradually falling edge. Such a data recording method by angular difference between a rising edge and a falling edge can demodulate an original data by extracting a differential component after inputting into a high-pass filter. Consequently, it is advantageous that the original data can be reproduced by a simplified circuit configuration even in a low C/N (Carrier to Noise ratio) circumstance.

An actual recording method by the amplitude-shift keying method is explained next.

Figures 14, 15, 16:
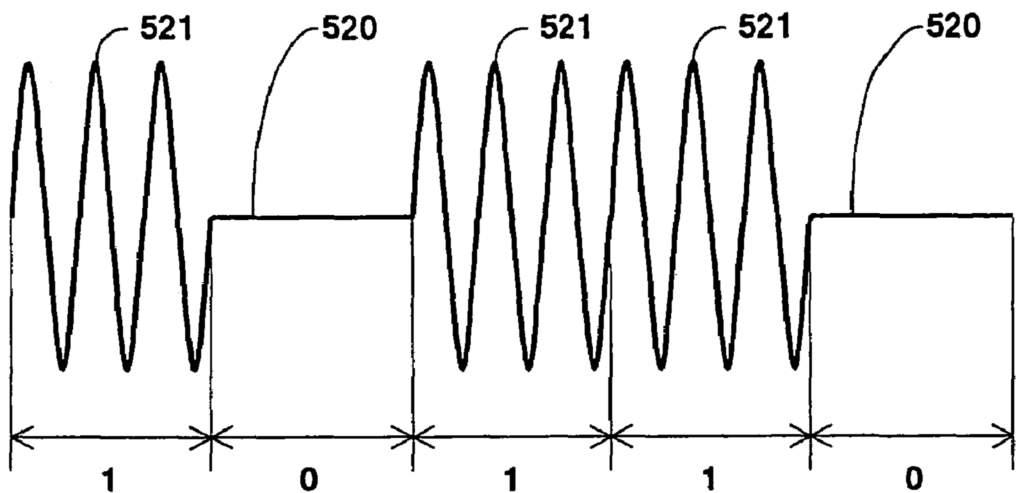
FIG. 14 is a waveform of digital date modulated by the amplitude-shift keying method.
FIG. 15 is a table exhibiting data change before and after modulating a base-band.
FIG. 16 is a table exhibiting an example of actual data change before and after modulating a base-band.

FIG. 14 is a waveform of a digital date (10110) that is recorded geometrically by the amplitude-shift keying method. In FIG. 14, a control data 300 or a location data 400 is composed of a plurality of amplitude sections 521 in which a groove is wobbled by a predetermined period of time and a plurality of non-amplitude sections 520 in which a groove is not wobbled. The amplitude section 521 and the non-amplitude section 520 corresponds to the data bit “1” and the other data bit “0” respectively. As shown in FIG. 14, the amplitude section 521 is constituted by 3 cycles of a fundamental waveform. A number of cycles is not limited to a specific number. However, in a case that the number of cycles is too many, a length of the non-amplitude section 520 becomes longer necessarily. A fundamental wave, which produces a gate when reproducing, is hardly detected as a result. Consequently, a range of 2 cycles to 100 cycles, more desirably a range of 3 cycles to 30 cycles is suitable for the amplitude section 521.

Further, no restriction is given to each length of the amplitude section 521 and the non-amplitude section 520 or a figure of amplitude of the amplitude section 521. If each amplitude of the plurality of amplitude sections 521 is identical to each other and the length of the amplitude section 521 is identical to that of the non-amplitude section 520 as shown in FIG. 14, a judgement of "1" or "0" can be performed by a sufficient amplitude threshold value and further a serial data can be read out by one time threshold value when reproducing. Consequently, a reproducing circuit can be simplified.

Furthermore, in a case that a jitter or fluctuation in the time axis direction is existed in a reproduced data, there is a merit of that such an identical amplitude and length can minimize affection by the jitter.

Moreover, if a code to be recorded is ideally symmetric, a total length of the plurality of the amplitude sections 521 is equal to that of the plurality of the non-amplitude section 520, and resulted in that no direct current component exists in a reproduced signal. In other words, decoding the data and servo controlling is released from excessive load, so that the ideally symmetrical code is advantageous for data processing and servo controlling.

As mentioned above, the information recording medium 1 according to the present invention is composed of at least the read only area 30 and the recording and reproducing area 40.

Further, a push-pull signal output is defined to be within a predetermined range so as to enable to perform the 2-area traversing reproduction.

Furthermore, the above-mentioned explanations are simplified explanations so as to exhibit fundamental items of the present invention. Therefore, it should be understood that the present invention would not be restricted to the information recording medium 1 shown in FIGS. 1 through 14. It will be apparent that many changes, modifications and variations in the arrangement of equipment and devices and in materials can be made without departing from the invention concept disclosed herein.

For example, with defining that a fundamental waveform of a wobbling groove is a sinusoidal waveform and a saw-tooth waveform in some cases, the first embodiment of the information recording medium 1 are depicted above. However, the fundamental waveform is not limited to the sinusoidal or saw-tooth waveform. Any shape of waveform such as triangular waveform, rectangular waveform and trapezoid waveform can be used for the fundamental waveform. However, these waveforms contain harmonic components. Therefore, selecting a frequency, which does not overlap with a recording frequency range that is initiated by a user when recording in the recording layer 12, is desirable when such a waveform is used for the recording and reproducing area 40.

Further, a fundamental waveform of a wobbling groove is on condition of a sinusoidal waveform. However, the present invention is not limited to the sinusoidal waveform. It is apparent that a cosine waveform also exhibits the same effect.

A method of directly recording a data itself on an information recording medium 1 is explained above as a recording method for the information recording medium 1. However, a recording method according to the present invention is not limited to the direct recording method. In a case of recording a long data array by the direct recording method, there is existed a possibility that a plurality of "0s" or "1s" may continue and resulted in generating a DC component in the data array. In order to eliminate such a possibility, it is acceptable that the data is previously modulated by the base-band modulation method and recorded. In other words, the method is that the data "0" and "1" are replaced with another codes previously so as to reduce a sequence of "0"s and "1"s to a certain number or less. With respect to such a method, the method such as Manchester code, PE (phase encoding) modulation, MFM (modified frequency modulation), M2 (Miller squared) modulation, NRZI (non return to zero inverted) modulation, NRZ (non return to zero) modulation, RZ (return to zero) modulation and differential modulation can be used independently or by combining some of them together.

FIG. 15 is a table exhibiting a change of fundamental data of before and after a base-band modulation.

With respect to a base-band modulation method, which is most suitable for the information recording medium 1 of the present invention, it is the Manchester code (biphase modulation) method. The Manchester code method is a method of applying 2 bits to each one bit of an original data to be recorded as shown in FIG. 15. That is, "00" or "11" is assigned to a data "0" to be recorded, and "01" or "10" to a data "1". Further, an inverted code of inverting a last code of preceding data is essentially applied to a head code of succeeding data when arranging the succeeding data after the preceding data.

FIG. 16 is a table of definite example exhibiting a change of data array of before and after a base-band modulation. As shown in FIG. 16, an original data "100001" is assigned to be a code array of "010011001101". The original data contains a sequence of four "0"s and is an asymmetrical data in which an appearing probability of "0" is twice that of "1". If such an asymmetrical data is modulated by the Manchester code method, a sequence of "0" or "1" is only two maximally and the original data is converted into a symmetrical data having equal appearing probability of "0" and "1". As mentioned above, the base-band modulation, which restricts a sequence of same bits within a certain quantity, is effective to increase stability of reading out a data. Consequently, the base-band modulation method is suitable for pre-treatment for a long array of location data.

With respect to a modulation method that is excellently suitable to the Manchester code method, there is existed the frequency-shift keying method as shown in FIG. 12. Particularly, in a case of a frequency-shift keying method in which phase difference of frequencies between the high frequency section 501 and the low frequency section 500 is assigned to be $\pm\pi/1.5$, that is, 360±120 degrees, a frequency ratio of high frequency to low frequency becomes 2.0, so that the frequency-shift keying method harmonizes with the Manchester code method that obtains a 1-bit data from 2 bits and resulted in reducing an error when extracting a data.

Further, there is existed another method of highly analyzing a location data and recording it in dispersion. For example, it is a recording method such that a location data is recorded as a combined data array of "10X" in combination with a dummy data, wherein "X" is either "0" or "1", and the data array is allocated at every predetermined interval. If the "X" is extracted by using the dummy data "10" as a data trigger, the original location data can be restored. This method is effective for a format, which is allowed to read in a data array to be treated with taking a long period of time.

Furthermore, in a case that a changing-over point of a frequency or a phase corresponds to a changing-over point of a data such as the frequency-shift keying method and the phase-shift keying method, it is desirable from a viewpoint of data that the changing is clearly recognized. From such a point of view, there exists a method that modulates a data by the differential modulation method. Actually, by converting an original signal modulated by the NRZI modulation method, for example, to another signal modulated by the RZ modulation method, a differential waveform of the NRZI signal can be produced. A delayed waveform is produced first with respect to an original waveform by the NRZI modulation, and then a bipolar waveform is produced by differentiating between the original waveform and the delayed waveform. By flipping over or folding back one polarity of the bipolar waveform to the other polarity, a RZ modulation waveform is generated.

[Second Embodiment]

The information recording mediums 1 and 2 in disciform are exemplified above. However, a shape of an information recording medium according to the present invention is not limited to a disc shape. Any shape such as a card can be applicable to the information recording medium of the present invention.

Figure 17:
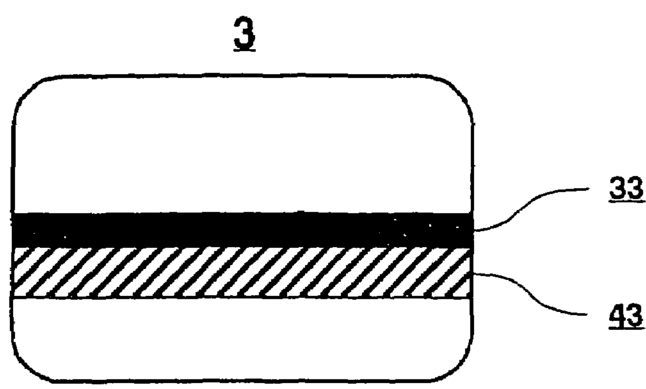
FIG. 17 is an information recording medium in a card shape according to a second embodiment of the present invention.
Figure 18:
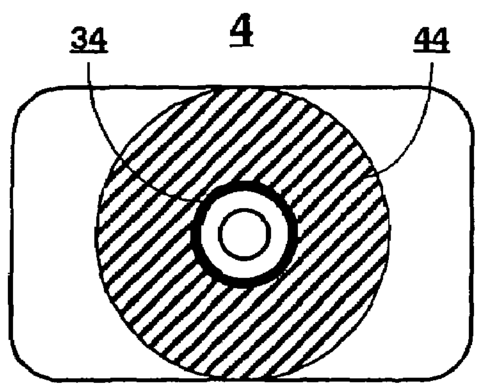
FIG. 18 is another information recording medium in a card shape according to the second embodiment of the present invention.
Figure 19:
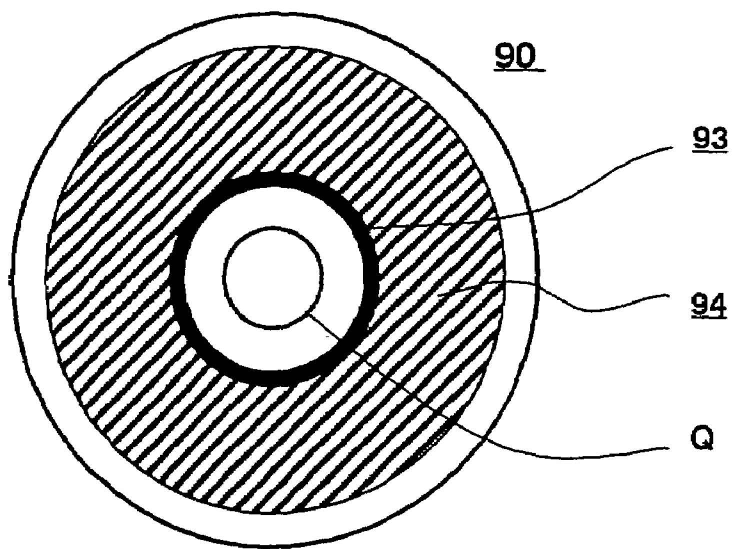
FIG. 19 is a plan view of an information recording medium in disciform according to the prior art.

FIG. 17 is an information recording medium in a card shape according to a second embodiment of the present invention. FIG. 18 is another information recording medium in a card shape according to the second embodiment of the present invention. In FIG. 17, a card-shaped information recording medium 3 is composed of a read only area 33 formed in a strip and a recording and reproducing area 43 formed in a strip. In FIG. 18, another card-shaped information recording medium 4 is composed of a read only area 34 formed in a ring shape and a recording and reproducing area 44 formed in a ring shape.

[Third Embodiment]

A stacked information recording medium having multilayers (not shown) can be constituted as a third embodiment of the present invention by expanding the configuration of the information recording medium 1 of the present invention. For example, by laminating a substrate 13, a first recording layer, a first light transmitting layer, a second recording layer and a second light transmitting layer in order, that is, by laminating a second recording layer and a second light transmitting layer in order on a light transmitting layer 11 of the information recording medium 1, a stacked information recording medium having two layers of recording layer can be realized. By this configuration, individual user data can be recorded in the first and second recording layers independently, and resulted in increasing a recording capacity twice the recording capacity of the information recording medium 1.

Further, by laminating one set of the recording layer 12 and the light transmitting layer 11 repeatedly, a stacked information recording medium having a plurality of recording layers such as triple and quadruple layers can be realized.

The information recording mediums 1 through 4 are explained in details hereinbefore and fundamental areas of the present invention are explained. However, it is apparent that many changes, modifications and variations in the arrangement of equipment and devices and in materials without departing from the invention concept disclosed herein. For example, in the case of the information recording mediums 1 and 2 in disciform, its dimensions are not limited to one specific figure. Any diameter within a range of 20 mm to 400 mm can be applied for the information recording mediums 1 and 2 in disciform. A diameter such as 32, 41, 51, 60, 65, 80, 88, 120, 130, 200, 300 and 356 mm can be acceptable to the information recording mediums 1 and 2 in disciform.

Further, a wavelength of laser beam used for reproducing or recording and reproducing information is defined to be 405 nm. However, the wavelength is not limited to 405 nm. Any wavelength such as 1300, 980, 830, 780, 650, 635, 515, 460, 442, 430, 413 and 370 nm, and a wavelength in the region of any of them can be used for a laser beam for reproducing or recording and reproducing information.

Furthermore, a numerical aperture NA of a lens is not limited to 0.85. Any NA other than 0.85 such as 0.4, 0.45, 0.55, 0.60, 0.65, 0.7, 0.75, 0.8 and 0.9 can be applicable to a lens. A lens having an NA of more than 1, which is represented by the solid immersion lens, can also be acceptable.

A reproduction power information, that is, a most suitable reproduction power for reproducing a recording and reproducing area 40 can be previously recorded as one of control data in a read only area 30 of an information recording medium 1 according to the present invention. The reproduction power information is most effective for a phase-change type information recording medium 1 of which recording layer 12 is constituted by a phase-change material. Such a phase-change material has a merit of enabling to record a high-density record mark M easily by a high-power laser beam. On the contrary, the phase-change material is defective in that a record mark M once recorded is easy to be erased by continuous irradiation of a laser beam in relatively lower power while reproducing. In other words, so-called deterioration by reproduction light is recognized. Consequently, selecting a laser power as low as a record mark M is not erased actually is suitable for a reproducing apparatus. However, if the laser power is low, there is existed a defect that a laser noise increases relatively. Particularly, in a case of a violaceous laser beam that is emitted by a gallium nitride system semiconductor element as a light source, the deterioration by reproduction light appears remarkably. Therefore, in the phase-change recording process by using a violaceous laser beam, flexibility of selecting a reproduction power is extremely restricted and resulted in that excellently reproducing a plurality of information recording mediums 1, which are manufactured by a plurality of manufacturers independently, becomes harder by a single reproduction power. However, if an information about an optimum reproduction power is recorded in a predetermined area of an information recording medium 1, wherein the predetermined area is a read only area 30, a reproducing apparatus makes access to the read only area 30 first and collects an optimum value of reproduction power, and then the reproducing apparatus can reproduce appropriately by feed-backing the optimum value to a power driver for a reproduction laser beam. The collected optimum value of reproduction power can be recorded in a memory device in the reproducing apparatus for a while. Renewing an information about an optimum reproduction power by resetting a previous information at each time when loading or reproducing an information recording medium 1 can always conduct the optimum reproduction.

With respect to a method of collecting the optimum value of reproduction power, that is, a method of reading out a control data that contains a value of reproduction power from a read only area 30 hereupon, the control data is recorded by a wobbling groove not by a record mark M, so that the control data can be read out in a relatively wide power range without deterioration by reproduction light. Consequently, if a reproducing apparatus is designed to read a read only area 30 by a fixed laser power and to read a recording and reproducing area 40 by a variable optimum laser power, an information recording medium 1 according to the present invention can be reproduced appropriately.

More accurately, the read only area 30 is read by a fixed relatively higher laser power and the reproduction power is revised in accordance with a collected data of optimum reproduction power, and then the recording and reproducing area 40 is reproduced by the revised reproduction power.

In addition thereto, the reproduction power is changed when traversing two areas. A push-pull signal is a differential signal in the radial direction, so that change of luminous energy of the reproduction power when traversing two areas is relatively small and an impact when traversing is very little.

As mentioned above, the reproducing apparatus and the reproducing method results in drawing a performance of the information recording mediums 1 though 4 maximally.

Accordingly, an information recording medium of the present invention can be reproduced by an optimum condition, and resulted in that a most suitable recording and reproducing system can be established.

As detailed above, according to an aspect of the present invention, there is provided an information recording medium 1, which is composed of at lease a read only area 30 and a recording and reproducing area 40. By assigning each push-pull signal output of the read only area 30 and the recording and reproducing area 40 to be within a predetermined range, a traversing reproduction across two areas can be conducted smoothly.

It should be understood that many modifications and adaptations of the invention will become apparent to those skilled in the art and it is intended to encompass such obvious modifications and changes in the scope of the claims appended hereto.

What is claimed is:

1. An information recording medium having at least a read only area and a recording and reproducing area comprising at least:

a substrate;

a recording layer formed on the substrate so as to record and reproduce information; and a light transmitting layer having transparency formed on the recording layer, the information recording medium further comprising a wobbling groove corresponding to the read only area and another wobbling groove corresponding to the recording and reproducing area formed on the substrate without overlapping each other, wherein the recording and light transmitting layers are continuously adhered over at least two areas of the read only area and the recording and reproducing area, and wherein reflectivity of the recording layer is more than 5%, and wherein a push-pull signal output T3 reproduced from the read only area and another push-pull signal output T4 reproduced from the recording and reproducing area before recording satisfies relations of T3≧0.1 and T4=0.1, and wherein the wobbling groove corresponding to the read only area contains a wobbling groove modulated by the frequency-shift keying method, and wherein the other wobbling groove corresponding to the recording and reproducing area contains a wobbling groove modulated by the phase-shift keying method, and wherein a track pitch of the wobbling groove corresponding to the read only area is P3, another track pitch of the other wobbling groove corresponding to the recording and reproducing area is P4, a wavelength of reproducing light beam is λ and a numerical aperture of an objective lens for reproduction is NA, and wherein P3, P4, λ and NA satisfy relations of P3≦λ/NA, P4≦λ/NA and P3>P4.

2. A reproducing method of an information recording medium having at least a read only area and a recording and reproducing area, the information recording medium comprising at least:

a substrate;

a recording layer formed on the substrate so as to record and reproduce information;

a light transmitting layer having transparency formed on the recording layer; and a wobbling groove corresponding to the read only area and another wobbling groove corresponding to the recording and reproducing area formed on the substrate without overlapping each other, wherein the recording and light transmitting layers are continuously adhered over at least two areas of the read only area and the recording and reproducing area, and wherein reflectivity of the recording layer is more than 5%, and wherein a push-pull signal output T3 reproduced from the read only area and another push-pull signal output T4 reproduced from the recording and reproducing area before recording satisfies relations of T3≧0.1 and T4≧0.1, and wherein the wobbling groove corresponding to the read only area contains a wobbling groove modulated by the frequency-shift keying method, and wherein the other wobbling groove corresponding to the recording and reproducing area contains a wobbling groove modulated by the phase-shift keying method, and wherein a track pitch of the wobbling groove corresponding to the read only area is P3, another track pitch of the other wobbling groove corresponding to the recording and reproducing area is P4, a wavelength of reproducing light beam is λ and a numerical aperture of an objective lens for reproduction is NA, and wherein P3, P4, λ and NA satisfy relations of P3≦λ/NA, P4≦λ/NA and P3>P4, the reproducing method comprising the steps of:

reading the read only area; and reading the recording and reproducing area, wherein the step of reading the recording and reproducing area is sequentially conducted after the step of reading the read only area.

* * * * *